United States Patent
Hsu et al.

(10) Patent No.: US 9,916,441 B2
(45) Date of Patent: Mar. 13, 2018

(54) MOBILE DEVICE AND MONITORING METHOD ADAPTABLE TO MOBILE DEVICE

(71) Applicant: INSTITUTE FOR INFORMATION INDUSTRY, Taipei (TW)

(72) Inventors: Wei-Chao Hsu, Taipei (TW); Shih-Chao Cha, Taipei (TW); Tzu-Ching Liu, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 72 days.

(21) Appl. No.: 14/952,872

(22) Filed: Nov. 25, 2015

(65) Prior Publication Data
US 2017/0140147 A1    May 18, 2017

(30) Foreign Application Priority Data
Nov. 12, 2015  (TW) .............................. 104137365 A

(51) Int. Cl.
G06F 21/55    (2013.01)
H04W 88/02    (2009.01)

(52) U.S. Cl.
CPC ............. *G06F 21/55* (2013.01); *H04W 88/02* (2013.01)

(58) Field of Classification Search
CPC ................................. G06F 21/55; H04W 88/02
See application file for complete search history.

(56) References Cited

U.S. PATENT DOCUMENTS

| 5,734,907 A * | 3/1998 | Jarossay | G06F 8/31 717/114 |
| 8,844,028 B1 * | 9/2014 | Cheng | H04L 29/06 713/188 |
| 2005/0091487 A1 * | 4/2005 | Cross | G06F 21/10 713/165 |
| 2012/0159127 A1 | 6/2012 | Spradlin et al. | |
| 2014/0013429 A1 * | 1/2014 | Lu | G06F 21/50 726/22 |

(Continued)

FOREIGN PATENT DOCUMENTS

| CN | 104268479 A | 1/2015 |
| TW | 542955 B | 7/2003 |
| TW | 201427366 A | 7/2014 |

OTHER PUBLICATIONS

The office action of the corresponding UK application dated Jun. 29, 2016.

(Continued)

*Primary Examiner* — Hosuk Song
*Assistant Examiner* — J. Brant Murphy
(74) *Attorney, Agent, or Firm* — CKC Partners Co., Ltd.

(57) ABSTRACT

A mobile device includes a memory and a processor. The memory is configured to store a plurality of commands; the processor is configured to receive the commands and execute the following steps: receiving a function call and datum of a mobile application; determining if the received function call is a call to an predetermined application programming interface; determining if the received datum is labeled datum; and processing the received function call with a predetermined monitoring procedure when the received function call is the call to the predetermined application programming interface and the received datum is the labeled datum.

12 Claims, 5 Drawing Sheets

(56) References Cited

U.S. PATENT DOCUMENTS

| | | | |
|---|---|---|---|
| 2014/0090076 A1* | 3/2014 | Wang | G06F 21/60 726/26 |
| 2014/0157411 A1* | 6/2014 | Hsu | G06F 21/566 726/23 |
| 2015/0200955 A1* | 7/2015 | Martin | G06F 21/562 726/23 |
| 2015/0220730 A1* | 8/2015 | Chen | G06F 21/53 726/22 |

OTHER PUBLICATIONS

The office action of the corresponding Taiwan application dated Jun. 27, 2016.

* cited by examiner

MOBILE DEVICE AND MONITORING
MOBILE DEVICE AND MONITORING METHOD ADAPTABLE TO MOBILE DEVICE

RELATED APPLICATIONS

This application claims priority to Taiwan Application Serial Number 104137365, filed Nov. 12, 2015, which is herein incorporated by reference.

BACKGROUND

Technical Field

The present disclosure relates to a mobile device and a monitoring method adaptable to the mobile device.

Description of Related Art

With the increasing popularity of the mobile device, the application installed in the mobile device has become the main target of malicious attacks, and currently the defending and detecting techniques used for the mobile device mainly include: detection of application behavior with abnormal authority, detection of behavior on an application programming interface, detection of abnormal network behavior of an application, and detection of configuration security settings.

However, the current defending and detecting technique is designed for detecting a malicious program, and the technique used for detecting a non-malicious program is still quite insufficient. Furthermore, the current defending and detecting technique is still very inadequate for detecting application vulnerabilities. When the data operation process is not properly protected, the restricted data stored in the mobile device is liable to suffer from malicious utilization.

Therefore, currently it has become an urgent problem to be solved in the related field to effectively improve the current defending and detecting technique, including enhancing the detection of application vulnerabilities to reduce the risk of data leakage.

SUMMARY

In view of the above problem, the present disclosure is proposed to provide a mobile device and a monitoring method adaptable to the mobile device, so as to overcome and solve the aforementioned problem.

An aspect of the disclosure provides a mobile device. The mobile device includes a memory and a processor. The memory is configured to store a plurality of commands. The processor is configured to receive the commands and execute the following operations. A function call and a datum of a mobile application are received. The received function call is determined if it is a call to a predetermined application programming interface. The datum is determined if it is a labeled datum. The received function call is processed with a predetermined monitoring procedure when the received function call is the call to the predetermined application programming interface and the received datum is the labeled datum.

Another aspect of the disclosure provides a monitoring method adaptable to a mobile device, and the monitoring method includes the following steps. A function call and datum of a mobile application are received by a processor. The function call is determined if it is a call to a predetermined application programming interface by the processor. The datum is determined if it is labeled datum by the processor. The received function call is processed with a predetermined monitoring procedure by the processor when the received function call is the call to the predetermined application programming interface and the received datum is the labeled datum.

In the following embodiments the above general description is described in details and the technical solutions of the present disclosure is further explained.

BRIEF DESCRIPTION OF THE DRAWINGS

In order to make the foregoing as well as other aspects, features, advantages, and embodiments of the present disclosure more apparent, the accompanying drawings are described as follows.

DETAILED DESCRIPTION

Figure 1:
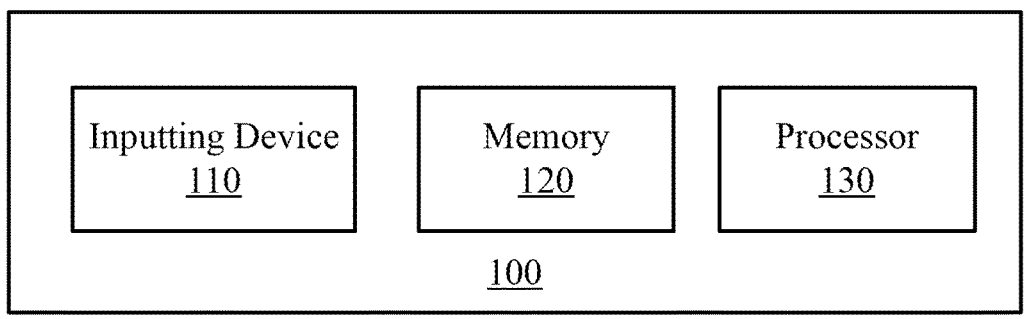
FIG. 1 is a block diagram of a mobile device according to an embodiment of the disclosure.

Referring to FIG. 1, FIG. 1 is a block diagram of a mobile device 100 according to an embodiment of the disclosure. The mobile device 100 includes an inputting device 110, a memory 120 and a processor 130.

The mobile device 100 may be a smart phone, a personal digital assistant (PDA), a handheld computer, a touch-type tablet computer, and any other portable mobile device with a computing function.

The inputting device 110 may be an external button, a screen button or a physical button. A user can label data stored in the memory 120 by touching a selection button (e.g., an up button or down button). In an embodiment, the inputting device 110 can label the data stored in the memory 120, including personal identifying data, personal account data, international mobile subscriber identity (IMSI) of handheld device, international mobile equipment identity (IMEI) of handheld device, company's business data, company's financial data, company's strategic planning, company's client data, computer-program source code, product design data, and any data considered important to the user.

The memory 120 is a volatile memory (e.g., a dynamic random access memory (DRAM) or a static random access memory (SRAM)), a non-volatile memory (e.g., a hard disk drive (HDD) or an external hard drive), a solid-state non-volatile memory (e.g., a flash memory), and any other memory which has a storing function and is allowed to be connected to the mobile device 100 through a wired or wireless manner.

The processor 130 is an independent microprocessor or a central processing unit (CPU). In an embodiment, the memory 120 includes a plurality of commands executable by the processor 130, wherein the plurality of commands includes commands received by the processor 130 for executing the following steps. A user is allowed to label a datum stored in the memory 120 through the inputting device 110.

In an embodiment, the memory 120 includes a plurality of commands executable by the processor 130 and data, wherein the plurality of commands includes a command of determining if the datum is labeled datum by the processor 130.

In an embodiment, the memory 120 includes a plurality of commands executable by the processor 130, wherein the plurality of commands includes commands received by the processor 130 for executing the following step. A user is allowed to set through a call to an application programming interface through the inputting device 110.

In an embodiment, the memory 120 includes a plurality of commands and a function call to an application (e.g., a mobile application) executable by the processor 130, wherein the plurality of commands includes a command of determining if the function call to the application is a function call to a predetermined application programming interface by the processor 130.

In an embodiment, the memory 120 includes a plurality of commands executable by the processor 130, wherein the plurality of commands includes a command of monitoring the process of executing the labeled datum by the application by the processor 130.

More detailed descriptions of the execution process of the mobile device 100 are provided hereafter.

Figure 2:
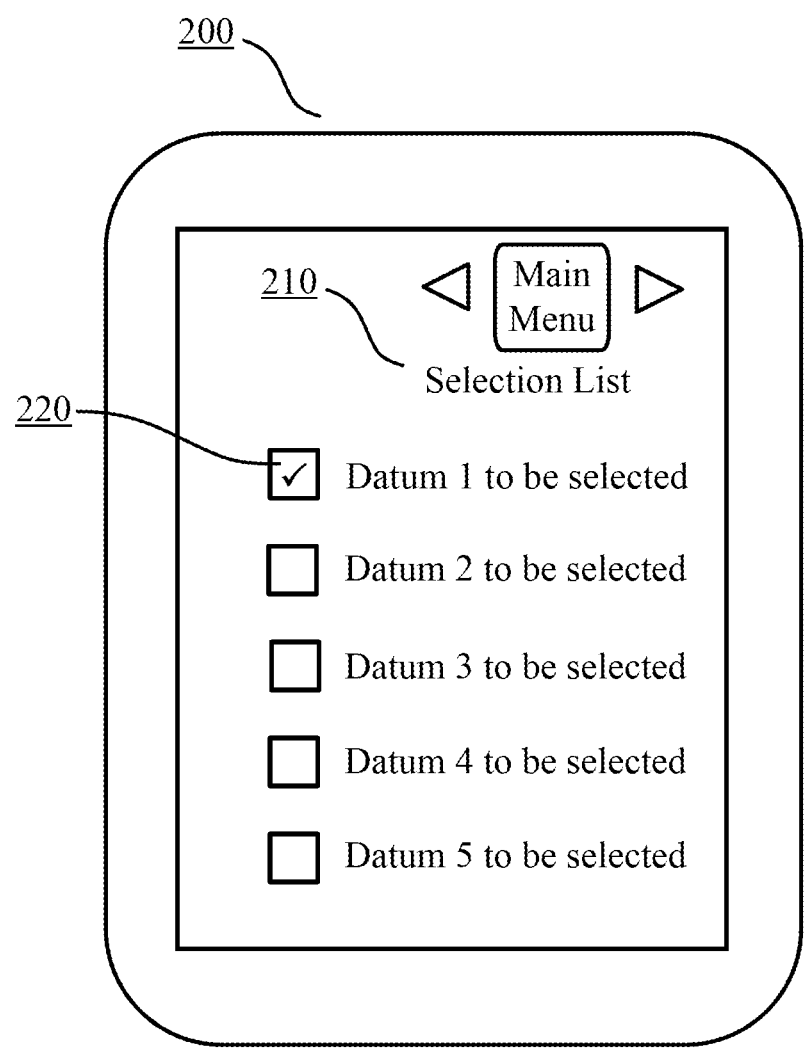
FIG. 2 is a schematic view of a selection list screen of the mobile device according to an embodiment of the disclosure.

Referring to FIG. 2, FIG. 2 is a schematic view 200 of a datum label and a call for setting an application programming interface according to an embodiment of the disclosure. In the illustrated example, a user can label the datum stored in the memory 120 of FIG. 1 and set a call to an application programming interface by touching a corresponding selection icon (a representative one is shown as 220) of a selection list 210 on a screen of a mobile device.

Figure 3:
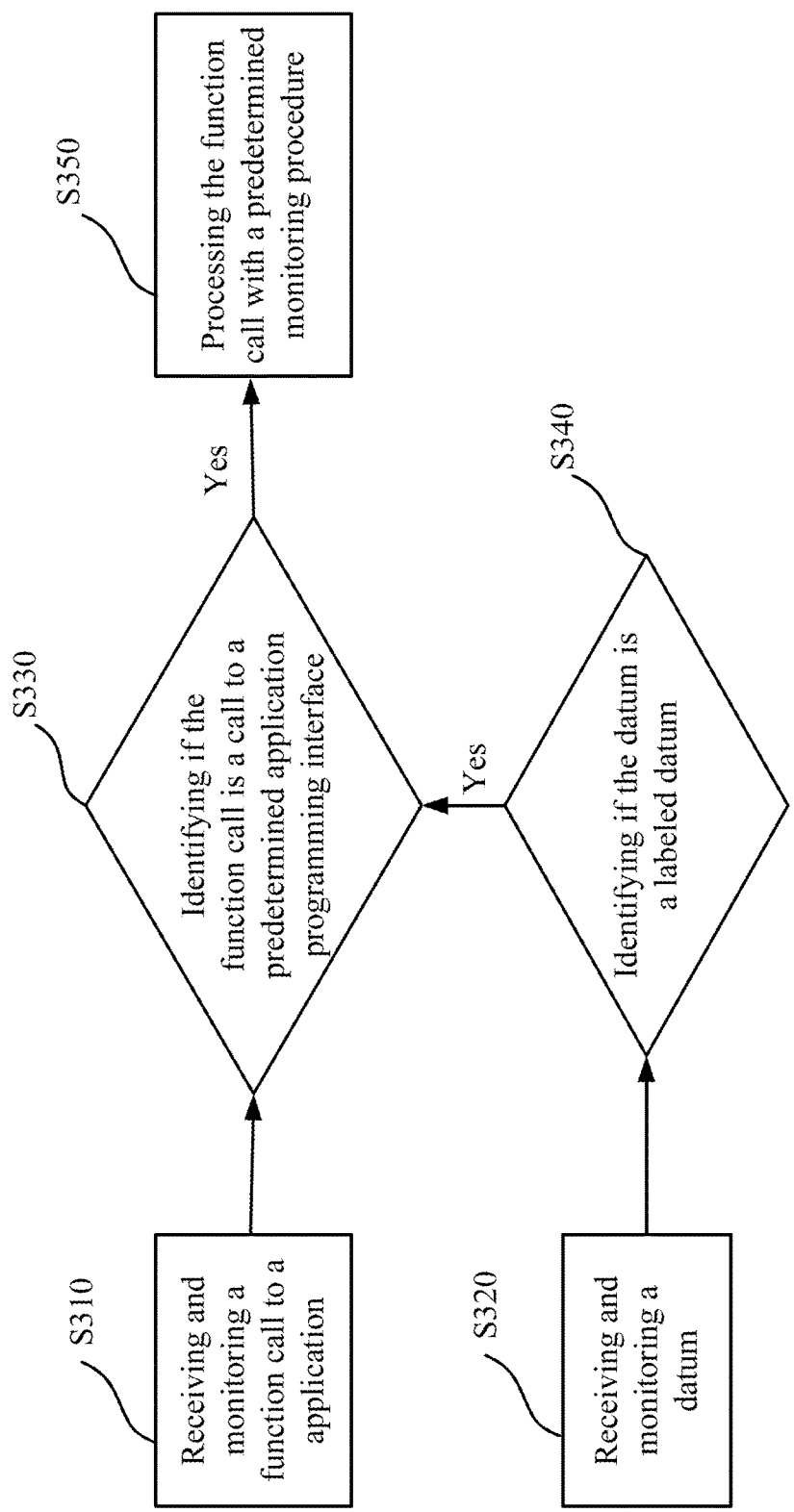
FIG. 3 is a flow chart of a monitoring method adaptable to the mobile device according to an embodiment of the disclosure.

Referring to FIG. 3, FIG. 3 is a flow chart of a monitoring method adaptable to the mobile device according to an embodiment of the disclosure. A monitoring method adaptable to the mobile device may be embodied with the mobile device 100 of FIG. 1, but the present disclosure is not limited to this. For ease and clarify of illustration, it is assumed that the monitoring method adaptable to the mobile device is embodied with the mobile device 100 of FIG. 1.

Referring to FIG. 3, in step S310, the processor 130 receives and monitors a function call to an application. In step S320, the processor 130 receives and monitors datum. In step S330, the processor 130 identifies if the function call is a call to a predetermined application programming interface. In step S340, the processor 130 identifies if the datum is a labeled datum. If the function call is the call to the predetermined application programming interface and the datum is the labeled datum, in step S350, the processor 130 processes the function call with a predetermined monitoring procedure.

Figure 4:
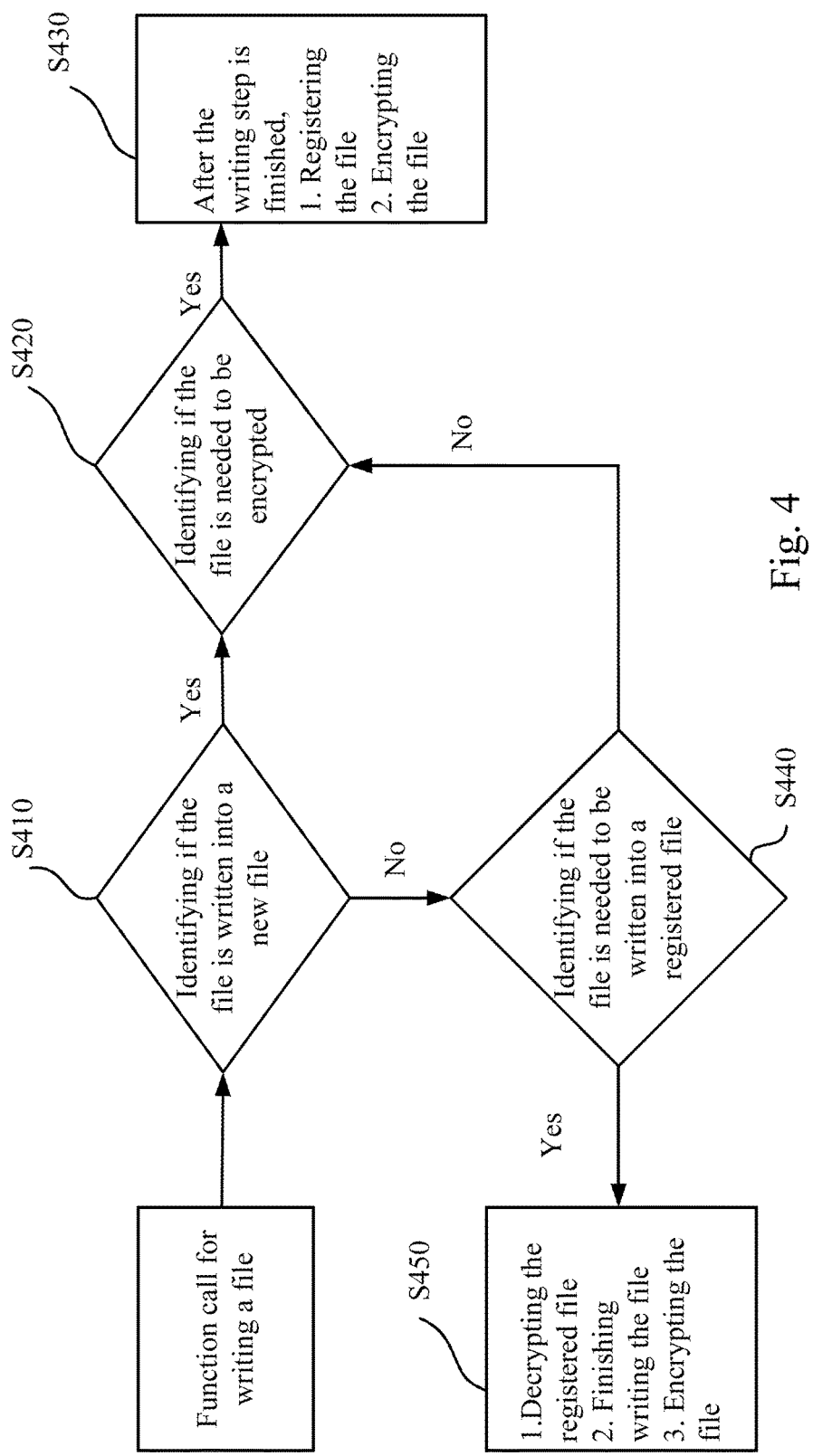
FIG. 4 is a flow chart of a monitoring method adaptable to the mobile device according to an embodiment of the disclosure.

For ease of illustration, a reference is also made to FIG. 3. FIG. 4 is a flow chart of the predetermined monitoring procedure according to an embodiment of the disclosure. In this embodiment, when the function call is a call that calls the predetermined application programming interface so as to write a file, in step S410, the processor 130 identifies if the file is written into a new file. When the file is needed to be written into the new file, in step S420, the processor 130 identifies if the file is needed to be encrypted by the mobile application. When the file is not encrypted by the mobile application, in step S430, the processor 130 encrypts and registers the file.

Referring to FIG. 4, when the file is not needed to be written into a new file, in step S440, the processor 130 identifies if the file is needed to be written into a registered file. When the file is needed to be written into the registered file, in step S450, the processor 130 decrypts the registered file, then allows the application to finish writing the file into the registered file, and subsequently encrypts the registered file.

Figure 5:
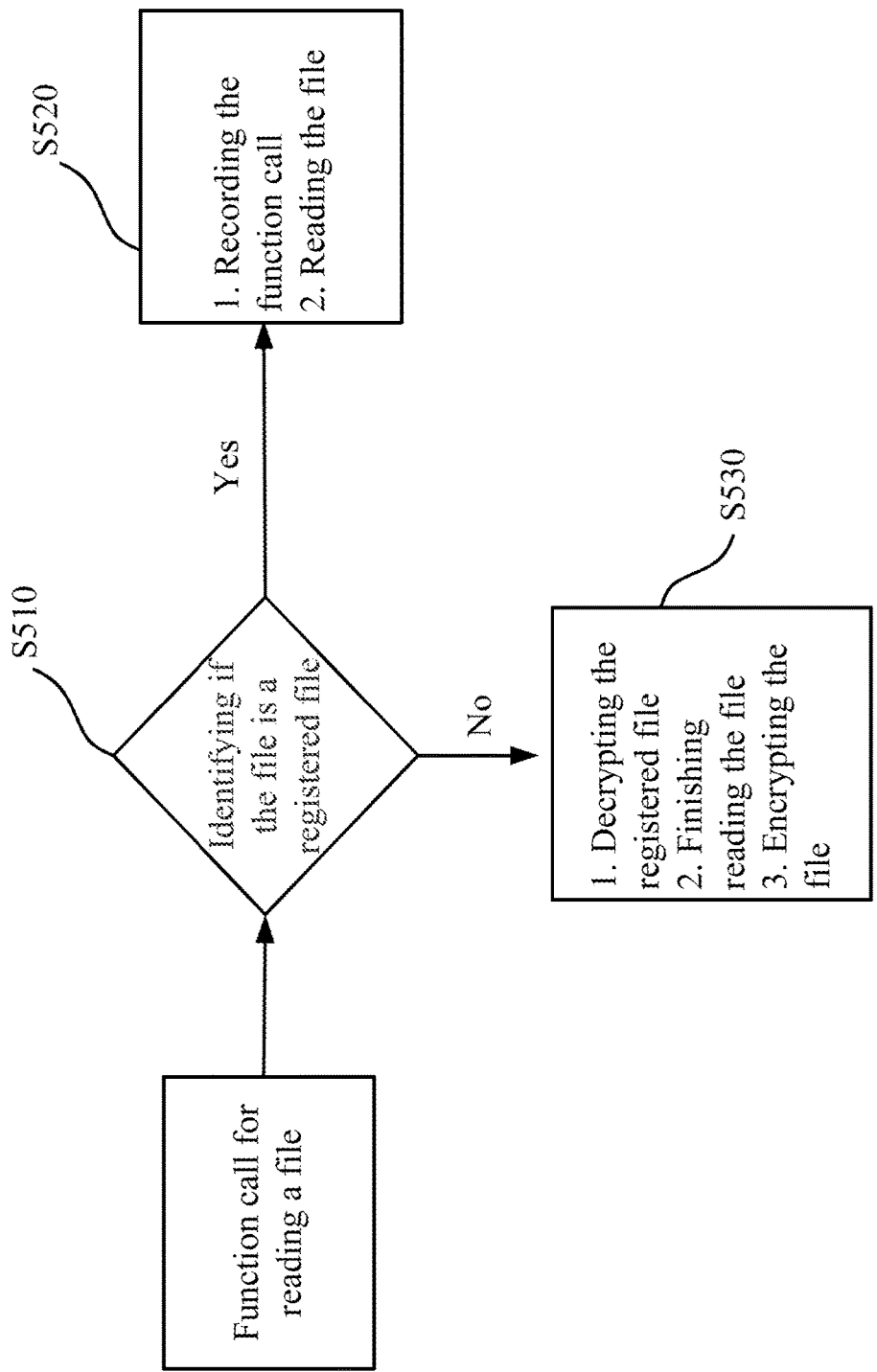
FIG. 5 is a flow chart of a monitoring method adaptable to the mobile device according to an embodiment of the disclosure.

For ease of illustration, a reference is also made to FIG. 3. FIG. 5 is a flow chart of the predetermined monitoring procedure according to an embodiment of the disclosure. In this embodiment, when the function call is a call that calls the predetermined application programming interface to read a file, in step S510, the processor 130 identifies if the file is a registered file. When the file is not a registered file, in step S520, the processor 130 records the function call and allows the application to read the file.

Referring to FIG. 5, when the file is the registered file, in step S530, the processor 130 decrypts the registered file, then allows the application to finish reading the registered file, and subsequently encrypts the registered file.

In an embodiment, when the function call to the predetermined application programming interface is not a function call for reading or writing the file, the processor 130 records the file, and allows the application to perform the function call or prevents the application from performing the function call.

Although the illustrative embodiments of the present disclosure have been described in details in connection with the accompanying drawings, it will be understood that the present disclosure is not limited to these embodiments. Various changes and modifications changes can be made by those of skills in the art, without departing from the scope and spirit of the present disclosure as defined by the appended claims.

What is claimed is:

1. A monitoring method adaptable to a mobile device including a processor and an inputting device having a screen button, wherein the monitoring method comprising:
    receiving a user default command of selecting a labeled datum and a call of a predetermined application programming interface through the screen button, wherein the processor sets the call of the predetermined application programming interface and the labeled datum according to the user default command;
    receiving a function call and a datum of an application by the processor;
    determining if the function call is the call to the predetermined application programming interface by the processor;
    determining if the datum is the labeled datum by the processor; and
    processing the function call with a predetermined monitoring procedure by the processor in response to the function call being the call to the predetermined application programming interface and the datum being the labeled datum, wherein the predetermined monitoring procedure executed by the processor comprises:
    in response to the function call being a call that calls the predetermined application programming interface to write a file, determining whether to register and encrypt the file by the application; and
    determining whether to record the function call and to allow the application to read the file in response to the function call being a call that calls the predetermined application programming interface to read the file.

2. The monitoring method of claim 1, wherein the predetermined monitoring procedure comprises:
    determining if the file is needed to be written into a new file by the processor in response to the function call being the call that calls the predetermined application programming interface to write the file;

determining if the file is encrypted by the application by the processor in response to the file being needed to be written into the new file; and registering and encrypting the file by the processor in response to the file being not encrypted by the application.

3. The monitoring method of claim 2, wherein the predetermined monitoring procedure further comprises:

determining if the file is needed to be written into a registered file by the processor in response to the file being not needed to be written into the new file; and decrypting the registered file, then allowing the application to finish writing the file into the registered file, and subsequently encrypting the registered file by the processor in response to the file being needed to be written into the registered file.

4. The monitoring method of claim 1, wherein the predetermined monitoring procedure comprises:

determining if the file is a registered file by the processor in response to the function call being the call that calls the predetermined application programming interface to read the file; and recording the function call and allowing the application to read the file by the processor in response to the file being not the registered file.

5. The monitoring method of claim 4, wherein the predetermined monitoring procedure further comprises:

decrypting the registered file, then allowing the application to read the registered file, and subsequently encrypting the registered file by the processor in response to the file being the registered file.

6. The monitoring method of claim 1, wherein the predetermined monitoring procedure comprises:

recording or preventing the function call by the processor.

7. A mobile device, comprising:

a processor;

an inputting device including a screen button and configured to receive a user default command of selecting a labeled datum and a call of a predetermined application programming interface through the screen button, wherein the processor sets the call of the predetermined application programming interface and the labeled datum according to the user default command; and a memory storing a plurality of commands, wherein the processor receives the commands and executes the following operations:

receiving a function call and a datum of an application (APP);

determining if the function call is the call to the predetermined application programming interface;

determining if the datum is the labeled datum; and processing the function call with a predetermined monitoring procedure in response to the function call being the call to the predetermined application programming interface and the datum being the labeled datum, wherein the predetermined monitoring procedure executed by the processor comprises:

in response to the function call being a call that calls the predetermined application programming interface to write a file, determining whether to register and encrypt the file by the application; and determining whether to record the function call and to allow the application to read the file in response to the function call being a call that calls the predetermined application programming interface to read the file.

8. The mobile device of claim 1, wherein the predetermined monitoring procedure executed by the processor comprises:

determining if the file is needed to be written into a new file in response to the function call being the call that calls the predetermined application programming interface to write the file;

determining if the file is encrypted by the application in response to the file being needed to be written into the new file; and registering and encrypting the file in response to the file being not encrypted by the application.

9. The mobile device of claim 8, wherein the predetermined monitoring procedure executed by the processor further comprises:

determining if the file is needed to be written into a registered file in response to the file being not needed to be written into the new file; and decrypting the registered file, then allowing the application to finish writing the file into the registered file, and subsequently encrypting the registered file in response to the file being not needed to be written into the registered file.

10. The mobile device of claim 7, wherein the predetermined monitoring procedure executed by the processor comprises:

determining if the file is a registered file in response to the function call being the call that calls the predetermined application programming interface to read the file; and recording the function call and allowing the application to read the file in response to the file being not the registered file.

11. The mobile device of claim 10, wherein the predetermined monitoring procedure executed by the processor further comprises:

decrypting the registered file, then allowing the application to read the registered file, and subsequently encrypting the registered file in response to the file being the registered file.

12. The mobile device of claim 7, wherein the predetermined monitoring procedure executed by the processor comprises:

recording or preventing the function call.

* * * * *